Patented Sept. 26, 1950

2,523,794

UNITED STATES PATENT OFFICE 2,523,794

SEPARATION OF UNSAPONIFIABLE MATERIALS FROM FREE FATTY ACIDS

Henry A. Vogel, Milwaukee, Wis., assignor to Pittsburgh Plate Glass Company, Allegheny County, Pa., a corporation of Pennsylvania No Drawing. Application December 21, 1945, Serial No. 636,496

6 Claims. (Cl. 260—397.2)

The present invention relates to the separation of unsaponifiable constituents such as sterols, cholesterols and the like from free fatty acids derived from fats, oils and greases, especially of the relatively saturated types such as occur in tallow, lard, cotton seed oil, coconut oil and the like.

One object of the invention is to provide a process whereby relatively sharp fractionation of the unsaponifiable constituents of free fatty acids of the foregoing types can be obtained.

A second object is to provide a process for separating the unsaponifiable constituents occurring in free fatty acids derived from fats and greases, which process is simple, inexpensive and highly efficient in operation.

These and other objects of the invention will be apparent from consideration of the following specification and the appended claims.

Fats and greases such as lard, tallow, cotton seed oil, coconut oil, etc. consist largely of complex mixtures of glycerides of free fatty acids together with small amounts of unsaponifiable constituents. For certain uses, the glycerides are often broken down by hydrolysis or by Twitchellizing to liberate the free fatty acids. The product as thus obtained, usually contains the unsaponifiable constituents such as sterols, cholesterols or the like which are undesirable in the free fatty acids but which often, if recoverable, are of considerable value in the production of pharmaceuticals, wetting agents and the like.

Various methods have been proposed for the fractionation of the complex mixture in order to separate off the stearates, palmitates and the like from the more unsaturated oleic acid and similar unsaturated components. One common method has involved crystallization in which the mixture is sharply chilled to predetermined values in order to crystallize out the more saturated acids. This mixture is then subjected to filtration in order to remove the solid constituents from the liquid. The material usually is quite difficult satisfactorily to filter. The expense of cooling the mixtures to a satisfactory degree for crystallization is also considerable.

A second method has involved chilling the fats or greases in order to obtain a solid product which was then subjected to pressure in hydraulic presses in order to squeeze out the more liquid components. This process, too, was expensive and time consuming and separation of the various components was not satisfactory.

Heretofore, no very satisfactory process has been available for eliminating the sterols and cholesterol components of the free fatty acid mixture.

The present invention contemplates the removal of the unsaponifiable components either with or without the fractionation of the free fatty acids as may be desired. Essentially the process involves treatment of the mixture of free fatty acids and unsaponifiables such as are obtained from tallow, lard, cotton seed oil, coconut oil and other fats and oils with ammonia to form ammonia soaps of the free fatty acids. These ammonia soaps can easily be crystallized from solvents such as methyl ethyl ketone or chlorinate hydrocarbons such as tetrachloro ethane or paraffinic naphthas or alcohols as well as various other non-aqueous solvents and the crystals are relatively easy to filter from the liquids.

As previously indicated, various solvents may be employed as media for the formation of and separation of ammonium soaps of free fatty acids. Of course, the solvent medium must be a non-solvent for the ammonium soaps. The modes of procedure in preparing ammonium soaps of the free fatty acids in all of these solvents are similar. The preparation of the soap mixtures in the petroleum hydrocarbons such as pentane or the mixture of hexane and heptane may be regarded as typical. Such procedure is described as follows:

FORMATION OF AMMONIUM SOAPS

The formation of the ammonium salts or soaps of the free fatty acids to be fractionated may be accomplished by simply adding anhydrous liquid or gaseous ammonia while the acids are dissolved in the petroleum hydrocarbon solvent. Gaseous ammonia may be bubbled into or otherwise contacted with the solutions of acids or even the undissolved acids. Anhydrous liquid ammonia can be added to the solution or the free acids under pressure or at atmospheric pressure. It is also possible to effect a preliminary treatment of the free fatty acids with ammonia for example while it is dissolved in alcohol or other non-aqueous solvents. The resultant ammonium salt or soap mixture can then be suitably treated with or crystallized from the petroleum hydrocarbon in accordance with the provisions of the present invention, Assuming that it is desired to effect the formation of the salts or soaps in the paraffinic hydrocarbon solvent, the acids are dissolved in the hydrocarbon in any convenient manner. The ratio of hydrocarbon to acid mixture may vary over a relatively broad range, for example within the proportions of 3 to 12 parts of solvent for each part of the fatty acid mixture. Parts are to be considered as being by weight.

The solvent ratio seems to be a factor affecting the possible separation, which acts in two ways—chemically and mechanically. The solvent ratio must be high enough so that the mixture after ammonia addition is still somewhat liquid rather than a thick paste. When solvent ratios are very low, the mixture of ammonium salts becomes a thick paste and is almost unfilterable. In general, the higher the solvent ratio, the greater the ease of filtration. Secondly, the higher solvent ratios tend to diminish the mutual solubility factor, i. e., the tendency of oleic acid to solubilize palmitic and stearic acid, so that with a higher solvent ratio and with other conditions the same, the amount of soluble ammonium salt will not necessarily be increased—in fact, may even be decreased because of the lesser tendency of the ammonium palmitate, for example, to remain in solution because of the solubilizing effect of ammonium oleate.

The amount of $NH_3$ used may be anywhere from a small per cent, e. g. 20%, equivalency up to an excess, e. g. 100%, of equivalency. The amount of insoluble ammonium salt obtained under any one set of conditions varies with the amount of $NH_3$ used, the amount of precipitate fraction obtained increasing as the amount of ammonia used is increased.

The temperatures involved in the saponification reaction in general are between 0° C. and 50° C. Usually, the solution of the fatty acids in the solvent is made at room temperature, except when the fatty acid mixtures are solid, in which case they may be melted and room temperature solvent added to obtain rapid dissolving action. The addition of ammonia to the fatty acid mixture is an exothermic reaction and the solution temperature usually rises from approximately 25–30° C. to 40–45° C. during this addition. Since the filtration of the precipitate is effected at lower temperatures most advantageously, the mixture may either be kept cooled during ammonia addition or else cooled after the addition has taken place. The temperature during addition should not be allowed to become too high for several reasons, chief among them being:

1. Lesser solubility of $NH_3$ at higher temperatures.
2. Greater solvent loss at higher temperatures.
3. Greater reversibility of the reaction:
   $$R—COOH+NH_3=R—COONH_4$$
   at the higher temperatures.
4. Longer cooling necessary after $NH_3$ addition.

When the ammonia has been added to form the soaps, the precipitation of most of the soaps can be easily conducted, merely by chilling of the solution and filtering off the resultant crop of crystals in one or more stages.

PARTIAL LIST OF SOLVENTS

A partial list of solvents appropriate for use as media for the formation of and also the precipitation of the ammonia soaps is appended below. If desired, formation of the soaps may be effected at a fairly high temperature. Precipitation is effected at a lower temperature. The ratio of solvent may be maintained substantially constant throughout, or formation of soaps may be effected in a low ratio of solvent and additional solvent may then be added before precipitation of the soaps. The additional solvent assists in washing out the unsaponifiables.

In the table, in the column marked "A," are given approximate ratios of solvents, the numbers given being parts by volume of solvent per part by volume of fatty acid mixture. Under column "B" are given approximate upper temperature limits in °C. for separation of the free fatty acids in the particular medium. Usually the solutions of ammonium soaps will be cooled somewhat below the figures given in order to precipitate a large, e. g. 80 to 90 per cent fraction of the soaps.

*Table I*

|  | A<br>Solvent Ratio | B<br>Temp., °C. |
|---|---|---|
| MONOHYDRIC ALCOHOLS | | |
| Normal butyl alcohol | 6 | 25 |
| Isopropanol | 6 | 15 |
| MONOETHER ALCOHOLS | | |
| Methyl ether of ethylene glycol | 8 | 10 |
| Ethyl ether of ethylene glycol | 4 | 14 |
| Methyl ether of diethylene glycol | 3 | 15 |
| Acetate of ethyl ether of ethylene glycol | 4 | 15 |
| Butyl ether of ethylene glycol | 8 | 10 |
| CHLORINATED ALIPHATIC HYDROCARBONS | | |
| Ethylene dichloride | 8 | 0 |
| Tetrachloro ethane | 8 | 0 |
| Trichloro ethane, etc. | 8 | 0 |
| LIQUID PARAFFINIC HYDROCARBONS | | |
| Pentane | 8 | 20 |
| Hexane-heptane mixture | 8 | 15 |

SEPARATION OF THE AMMONIUM SOAPS FROM THE SOLVENT

The ammonium soaps start to crystallize from any of the media whenever the temperature is sufficiently low. The solvent ratios given in Table I are merely typical. It will be apparent that considerable variation is entirely permissible. Usually the solvent will be within a range of 3 to 12 parts by volume per part of oil. The temperatures of separation given are also those at which substantial crystallization of the more saturated ammonium soaps of the free fatty acids occur. It will be appreciated that as the temperatures of the solutions are further decreased the percentage of the soaps remaining in solution decreases. In most instances it will be desirable to reduce the temperature until the major portion of the free fatty acids has been precipitated. This is a general rule for all solvents. In the majority of instances, cooling will be continued until 50 to 90 or even 95 per cent of the free fatty acids have been eliminated.

It is to be understood that the precipitated soaps can be removed from the solutions consisting essentially of the unsaponifiable constituents such as sterols and cholesterols together with a residue of ammonium soaps of more unsaturated free fatty acids by filtration, centrifugation or similar methods.

In many instances, it is desirable to perform the separation of the soaps from the medium in stages which can best be accomplished by concentrating the filtrate from a first crystallization to an appropriate degree and cooling the resultant second concentrate to precipitate a second crop. Ammonia may also be added to the second concentrate in order to make up losses and to assure adequate concentration to maintain the soaps in the second precipitation.

A suitable procedure would be to dissolve the acids in the ratio of 1 part by weight per 4 to 6 parts of solvent. To the solution ammonia is added and the resultant solution is cooled to crystallize out the ammonia soaps after which the crystallized soaps are filtered off. The filtrate may be of a concentration of 5 to 10% solids. Cooling these dilute solutions would bring down but little additional soaps. However, the solvent can be evaporated to a concentration for example of 15–25% of solids and the solution again treated with ammonia. When the solution is again cooled, a second large crop of soap crystals will come out and can be filtered off. The second filtrate may be of a solids content of 5 to 10% and can be concentrated, treated with ammonia and recooled to provide a third crop of crystals if so desired.

The following constitutes a diagram of the procedure:

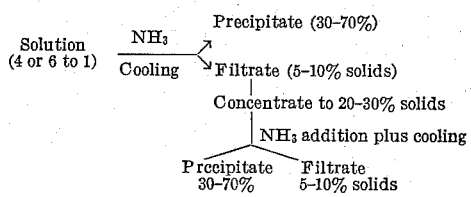

The soaps of the free fatty acids can be further purified of the unsaponifiable components by appropriate washing with the same solvent medium or with a different medium in order to dissolve out occluded unsaponifiable matter. Tallow acids and similar relatively highly saturated acids are especially well adapted for purification by washing.

Concentrations of from ten- to twenty-fold, or even greater may be accomplished under the proper precipitating conditions (i. e., excess NH3, low temperature of filtration, low solvent ratio, or repeated precipitation). For example, if 95% of the initial fatty acid-unsaponifiable mixture is precipitated and washed so that it contains little or no occluded unsaponifiable constituents, the solvent-free filtrate to which the wash materials have been added will show approximately a twenty-fold increase in unsaponifiable constituents.

It will be appreciated that when crystallization of the ammonium soaps has been conducted as far as is practicable, or until the unsaponifiable matter starts to crystallize off, some of the fatty acids or soaps thereof may still remain in solution. Based upon the original fatty acid mixture, the amount of saponified or saponifiable matter may be small, e. g. 2 to 5 per cent more or less. However, the ratio of this material to the unsaponifiable matter in the filtrate may be fairly high. For example, the mixture may comprise 40, 50, 60 or even higher percentages of free acids dependent upon the proportion of soaps of fatty acids crystallized from the solution. In order to eliminate these acids from the unsaponifiable, conventional procedures can be resorted to or, if preferred, the solution can be washed with an aqueous medium in order to extract out the soaps and leave the unsaponifiable matter in solution. Thus, the filtrate may be washed with water or with water alkalized with ammonia or caustic soda or potash or other alkali capable of forming water soluble soaps. Needless to say, the solvent should be water immiscible or at least of low water miscibility.

The free fatty acids can easily be recovered from the ammonium soaps by acidification with an acid medium such as sulphuric acid, hydrochloric acid, phosphoric acid, or the like. The ammonia can also be liberated from the soaps by appropriately heating them. Usually a temperature of about 120 to 150° C. is sufficient to drive off the ammonia leaving the free fatty acids in a high state of purity.

The sterols, cholesterols and the like unsaponifiable components are easily recovered by evaporation of the solvent medium therefrom. These materials are adaptable for use in the preparation of pharmaceuticals, such as hormone and for other purposes well recognized in the art.

The embodiments of the invention herein disclosed are merely typical. Numerous modifications can be made therein without departure from the spirit of the invention or the scope of the appended claims.

I claim:

1. In a process of obtaining a concentration of sterols that occur in a natural fat from a mixture comprising (A) the ammonium soaps of the fatty acids and (B) the sterols of said natural fat, the steps of dissolving 1 part by volume of the mixture in 3 to 12 parts by volume of an organic solvent of fatty acids, which is also a solvent of the ammonium soaps and the sterols, then chilling the resultant solution of ammonium soaps, sterols and solvent, selectively to crystallize out 50% to 95% of the ammonium soaps from the solution and to leave in solution in said solvent a residue of the ammonium soaps and a concentrate of the sterols, washing the solution with water selectively to remove the residue of ammonium soaps and to leave the sterols in solution in said solvent, and evaporating the solvent from the solution of sterols to obtain said concentrate.

2. A process as defined in claim 1 in which the organic solvent is isopropyl alcohol.

3. A process as defined in claim 1 in which the solvent is an aliphatic hydrocarbon of 5 to 7 carbon atom chain length.

4. A process as defined in claim 1 in which the organic solvent is a mono ether of ethylene glycol.

5. A process as defined in claim 1 in which the solvent is a chlorinated aliphatic hydrocarbon.

6. A process as defined in claim 1 in which the solvent is selected from a class consisting of:

Normal butyl alcohol
    Isopropanol
    Methyl ether of ethylene glycol
    Ethyl ether of ethylene glycol
    Methyl ether of diethylene glycol
    Acetate of ethyl of ethylene glycol
    Butyl ether of ethylene glycol
    Ethylene dichloride
    Tetrachloroethane
    Trichloroethane
    Pentane
    Hexane-heptane mixture

HENRY A. VOGEL.

(References on following page)

REFERENCES CITED

The following references are of record in the file of this patent:

UNITED STATES PATENTS

| Number | Name | Date |
|---|---|---|
| 2,098,254 | Mattill et al. | Nov. 9, 1937 |
| 2,182,767 | Thurman | Dec. 5, 1939 |
| 2,268,786 | Dijck | Jan. 6, 1942 |
| 2,276,517 | Segessemann | Mar. 17, 1942 |
| 2,293,676 | Myers et al. | Aug. 18, 1942 |
| 2,313,636 | Freeman | Mar. 9, 1943 |

FOREIGN PATENTS

| Number | Country | Date |
|---|---|---|
| 383,531 | France | Mar. 11, 1908 |

OTHER REFERENCES

Falciola-Gazz, Chim. ital. (1910), 40, II, pp. 217–29, 425–35.